United States Patent [19]

Schmidt et al.

[11] Patent Number: 4,764,564

[45] Date of Patent: Aug. 16, 1988

[54] PERFLUOROCARBON BASED POLYMERIC COATINGS HAVING LOW CRITICAL SURFACE TENSIONS

[75] Inventors: Donald L. Schmidt; Demetrius Urchick, both of Midland, Mich.

[73] Assignee: The Dow Chemical Company, Midland, Mich.

[21] Appl. No.: 877,594

[22] Filed: Jun. 23, 1986

Related U.S. Application Data

[62] Division of Ser. No. 609,180, May 11, 1984, Pat. No. 4,606,973.

[51] Int. Cl.$^4$ .................................................. C08F 8/34
[52] U.S. Cl. ................................. 525/328.2; 525/386
[58] Field of Search ........................... 525/328.2, 386; 526/243, 247, 248, 251

[56] References Cited

U.S. PATENT DOCUMENTS

| | | | |
|---|---|---|---|
| 3,654,244 | 4/1972 | Pittman | 526/243 |
| 4,469,836 | 9/1984 | Schmidt | 524/376 |
| 4,554,325 | 11/1985 | Schmidt | 525/326.8 |

Primary Examiner—Christopher Henderson

[57] ABSTRACT

Polymers comprising pendant amine-functional portions linked to a perfluorocarbon moiety having a perfluoroalkyl group. Such polymers can provide coating compositions which exhibit critical surface tensions of wetting of less than about 15 dynes/cm.

5 Claims, No Drawings

PERFLUOROCARBON BASED POLYMERIC COATINGS HAVING LOW CRITICAL SURFACE TENSIONS

This is a division of application Ser. No. 609,180, filed May 11, 1984, now U.S. Pat. No. 4,606,973.

BACKGROUND OF THE INVENTION

This invention relates to novel perfluorocarbon based polymeric materials useful as relese coatings and to processes for using such coatings as mold release agents.

A wide variety of molding applications require molding apparatus with surfaces which will easily release molded articles and molding materials. Polymer deposits on molding apparatus surfaces resulting from the "sticking" occurring during molding processes not only make it more difficult and time consuming to remove molded parts from said molds, but such deposits have a tendency to deteriorate and fragment, thus decreasing the quality of the surfaces of products molded therefrom.

One approach directed towards obtaining surfaces which readily release adhesives has involved the application of various hydrocarbon and silicone oils and waxes to the surfaces of molds which are exposed to said polymer compositions. Commonly, hydrocarbon and silicone oils and waxes are sprayed or wiped onto injection molding apparatus, which is then used for the molding of polymers and prepolymers. Unfortunately, it is generally the case that only one to about three injection cycles may be performed before it is necessary to retreat the mold with said nonstick agents.

Another approach for providing molding apparatus surfaces which have good release characteristics is the application of fluorinated polymers, such as tetrafluoroethylene. These types of polymers are typically applied to a surface as small solid particles or as a coating. Unfortunately, these types of polymers are typically bound to surfaces with nonfluorinated binders or by a difficult process involving sintering of the polymer particles at high temperatures.

Perfluorinated polymers are believed to release because they produce a very low critical surface tension of wetting ($\gamma_c$). More recently, as disclosed in U.S. Pat. No. 4,344,993, a combination of a hydrophilic polymer with up to about 0.5 weight percent perfluorocarbon and crosslinked with a cyclic sulfonium zwitterion yields a surface coating having a surface tension of wetting of less than that of coatings consisting of 100 percent perfluorocarbon. Although this type of coating is useful for preventing deposits of non-aqueous polymerization reactants and products from adhering to reactor surfaces in the production of olefinic polymers, such a coating does not adhere adequately to surfaces of conventional molding apparatus when amounts of perfluorocarbon greater than 0.5 weight percent are employed.

Therefore, it is highly desirable to provide an improved coating which adheres well to a molding apparatus surface, and a process for using same which will significantly reduce the undesirable deposition of material and sticking on internal surfaces of molding apparatus by providing a low $\gamma_c$.

SUMMARY OF THE INVENTION

The present invention is a polymer comprising pendant amine-functional portions linked to a perfluorocarbon moiety having a perfluoroalkyl group through a carboxy functionality.

In another aspect, the present invention is an adherent coating composition comprising the polymer of this invention.

The amount of perfluorocarbon moiety present in the polymer is such that the resulting coating can exhibit a critical surface tension of wetting of less than about 15 dynes per centimeter (dynes/cm). Surprisingly, the perfluorocarbon-containing polymer coating composition of the present invention can provide a surface having a critical surface tension less than that of a coating consisting entirely of a linear perfluorocarbon, such as a homopolymer of tetrafluoroethylene. The coating composition of this invention provides a permanently bound coating which can be easily applied, and which is not removed or wet by most solvents.

In another aspect, the present invention is a composition comprising a polymer comprising amine-functional portions, a nucleophilic fluoroalkyl-containing carboxylic acid, and a suitable solvent. When cured, said composition yields the aforementioned adherent coating composition, as defined hereinbefore. In yet another aspect, this invention is a coated substrate wherein said composition is contacted with the substrate and cured.

The coating compositions of this invention are particularly useful in reducing the amount of sticking of material on the internal surfaces of the molding apparatus. Accordingly, in another aspect, this invention is such a process for reducing the sticking of material to surfaces such as internal surfaces of molding apparatus which comprises applying a solution of the aforementioned composition to the internal surfaces of molding apparatus and curing. Such a process is advantageously employed in the molding of polymers such as polyethylenes, polypropylenes, polycarbonates, polyurethanes, and the like.

DETAILED DESCRIPTION OF THE INVENTION

The polymer comprising pendant amine-functional portions of this invention have repeating units of the general formula:

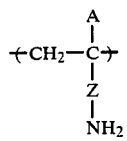

wherein A is hydrogen, chloride or methyl; and Z is a bridging group containing at least one carbon atom and which can contain oxygen, nitrogen and/or sulfur atoms. Examples of suitable monomers useful in preparing the polymers of this invention include acrylamide, 2-aminoethylmethacrylate, vinylbenzylamine, and the like.

Polymers of this invention are generally represented by the formula:

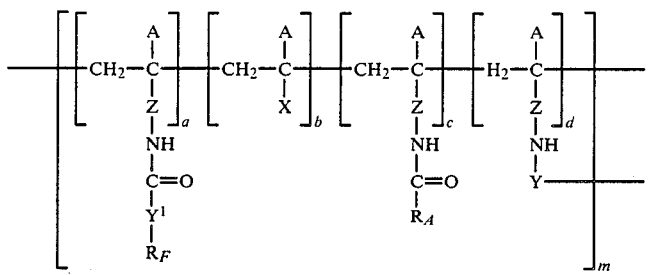

wherein a+b+c+d=1, a is greater than 0, b is from about 0 to about 0.9, c is from about 0 to about 0.9, d is from 0 to about 0.8, and m is preferably about 100 to about 10,000. A is H, chloride or methyl. $Y^1$ is as defined hereinafter. Z is a bridging group containing at least one carbon atom. $R_F$ is saturated perfluoroaliphatic containing moiety as described hereinafter. X can vary and is preferably an essentially nonionic moiety or an ionic moiety. X can include, for example, a moiety derived from butadiene, isoprene,

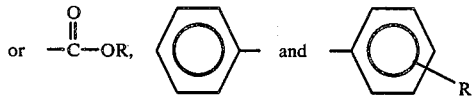

wherein R is hydrogen or alkyl comprising from 1 to about 12 carbon atoms. Y is the remaining portion of a polycarboxylic acid or other species containing an acidic hydrogen and is present in such a way that crosslinking is introduced to the polymer system. $R_A$ is an alkyl or aryl moiety as defined hereinafter.

Polymers of this invention are advantageously prepared by reacting monomers having pendant amine-functionalities and optionally other monomers in order to obtain a polymer comprising pendant amine functionalities. The polymer is contacted with a perfluoroalkyl-containing acid and optionally, the other acids as defined hereinafter. The mixture is then subjected to conditions such that the acid functionality reacts with an oxazoline or oxazine functionality to form an amide-type linkage.

Crosslinking can be introduced to the polymer with a polyfunctional nucleophilic species such as carboxylic acid. Low equivalent weight polyfunctional carboxylic acids are preferred. Preferred polyfunctional carboxylic acids are the di- and tri-carboxylic acids. Examples of di-carboxylic acids include those represented by the formula:

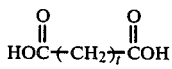

wherein t can range from 1 to about 40. The amount of crosslinking can vary and is employed in order to form a harder, more rigid product. Other suitable polyfunctional nucleophilic species include the aromatic carboxylic acids such as terephthalic acid, unsaturated carboxylic acids, and the like.

Moieties designated as $R_A$ generally are any alkyl or aryl moieties having functionalities which can be reacted with a pendant amine moiety to yield a pendant grouping. For example, $R_A$ can be derived from a carboxylic acid having from about 4 to about 25 carbon atoms.

Perfluoroalkyl-containing acids suitably employed in the practice of this invention include organic compounds represented by the formula:

$$R_F-Y^1-COOH$$

wherein $R_F$ is a perfluorocarbon or a saturated perfluoroaliphatic moiety containing a $F_3C-$ moiety and is linked to the carboxylic acid moiety through a moiety which does not substantially interfere with the nucleophilicity of the carboxy group, (i.e., $Y^1$) advantageously a hydrocarbon moiety preferably containing at least 2 carbon atoms. The perfluoroaliphatic or perfluorocarbon moiety advantageously contains from about 3 to about 18 carbons wherein substantially all are fully fluorinated, preferably from about 3 to about 14, more preferably from about 3 to about 10 of such carbons subject to the limitation that the fluoroaliphatic moiety is linked to the carboxylic acid moiety through an aliphatic hydrocarbon moiety (i.e., $Y^1$) containing at least 2 carbon atoms. $R_F$ can be linear, branched or cyclic, preferably linear. $Y^1$ contains a carbon-bonded hydrogen and can contain an oxygen atom, sulfur atom and/or a nitrogen atom bonded only to carbon atoms in the skeletal chain. More preferable are those linear perfluoroaliphatic moieties (i.e., $R_F$) represented by the formula: $C_nF_{2n+1}$ wherein n is in the range of about 3 to about 10. Most preferred are those linear perfluoroaliphatic moieties represented in the paragraph below.

Perfluorocarbon containing carboxylic acids of the formula $CF_3(CF_2)_pSO_2NH(CH_2)_qCOOH$; wherein p is from about 2 to about 15, preferably about 2 to about 9, and q is from about 2 to about 4 are preferred. An especially preferred perfluorocarbon containing carboxylic acid is the carboxylic acid form of the perfluorocarbon sold by DuPont under the trade name Zonyl ® FSA; or the carboxylic acid form of the perfluorocarbon sold under the trade name Fluorad ® FC 129 by the 3M Corporation. Examples of other preferred anionic perfluorocarbon starting materials, as well as methods of preparation are illustrated in U.S. Pat. Nos. 3,172,910 and 3,630,951.

The polymer containing pendant amine-functionalities is advantageously contacted with a nucleophilic, fluoroalkyl-containing carboxylic acid in the presence of a liquid that is a solvent for each of the species (i.e., a suitable solvent). Typically, such solvents include the alkanols such as ethanol, propanol, butanol, glycols, mixtures of suitable alkanols and mixtures of alkanols with water. If desired, aqueous ammonia can be added to the formulation in order to increase the shelf life of the mixture. In particular, the pendant amine-functionality undergoes a reaction with the fluoroalkyl-containing acid to apparently produce an amide-type linkage. The reaction is initiated, for example, by heat and/or loss of solvent after the polymer, fluoroalkyl-containing acid and solvent as applied to the surface of the substrate which is being treated.

Accordingly, the coating composition can be applied directly (i.e., without the prior application of a primer coating) to the interior surfaces of the molding apparatus in a convenient manner, such as wiping, spraying, brushing on, and the like. Brushing has been found to be satisfactory since it ensures complete coverage of all surfaces. Any uncovered areas, such as pinholes, etc., should be avoided since such exposed areas provide sticking sites for polymer build-up. It is most desirable that one layer of coating be applied. The amount of coating applied for the thickness thereof is not particularly critical so long as a continuous film over all interior surfaces of the molding apparatus is provided. In some instances, it is preferable to pretreat the internal surfaces of the reaction vessel with conventional chemical coupling agents. For example, prehydrolyzed silane coupling agents such as

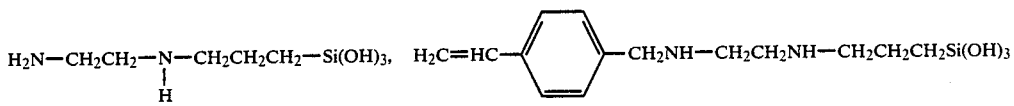

and the like are particularly useful for this purpose.

When said coating compositions are applied to the surface of a molding apparatus and cured, the resulting coatings are (1) inert to any polymeric reagents which will contact the coating in subsequent use, (2) can have a $\gamma_c$ of less than about 15 dynes/cm, and (3) will not wet with any common solvents.

Following the application of the coating composition of the interior surfaces of the mold, including product transfer conduits, etc., the coating can be heated in order to dry and cure the same. Any suitable heating method can be employed, such as radiant heating, heated air, and the like. Usually, temperatures within the range of 90° to about 160° C. are sufficient; with temperatures in the range of 110° to 160° C. being preferred. The temperature chosen will depend upon the time of drying. Thereafter, the molding to be carried out in the equipment can be commenced immediately. No particular modifications of processing techniques are required due to the presence of the coating. Further, utilization of the internally coated mold of the present invention does not adversely affect the heat stability or other physical and chemical properties of the polymers or other molded products produced therein. Ordinary care should, of course, be exercised to avoid abrading or rupturing the coating.

Compositions of this invention can be applied to fabrics such as cotton and nylon. For example, compositions of this invention are useful in treating fabrics in order to provide water and/or oil resistance to the fabric. See, for example, U.S. Pat. Nos. 4,325,857 and 4,388,372.

The following examples are illustrative embodiments of this invention and should not be construed as limiting its scope. Unless otherwise indicated, all parts and percentages are by weight.

EXAMPLE 1

Preparation of Poly 2-Aminoethylmethacrylate (Poly AEM)

Water (100 g) is added to 83.3 g of a 30 percent solution of AEM hydrochloride and the solution is placed in a stirred reactor under nitrogen and warmed to 50° C. Two solutions, A and B are added in 1.5 ml portions every 5 minutes for about 1 hour and the reaction is allowed to continue for about 6 hours at 50° C. Solution A contains 0.1 g of tert-butyl hydroperoxide in 18 ml of water and solution B contains 0.075 g sodium formaldehyde hydrosulfite, sold as Formapon ® by the Rohm & Haas Corporation, in 18 ml of water. The resulting Poly AEM hydrochloride is exchanged to the free amine with hydroxyl functionalized ion exchange resins.

PREPARATION OF COATINGS BASED ON POLY AEM

A coating solution is prepared by mixing 1.0 g of a 13.4 percent water solution of Poly AEM (1.04 mil eq.) with 3 g of diethylene glycol methyl ether, 0.05 g aqueous ammonia (29.2 percent ammonia) followed by 1.30 g of a 0.8N solution (1.04 mil eq.) of $CF_3\text{-}(CF_2\text{-})_x CH_2 CH_2\text{---}S\text{---}CH_2 CH_2 COOH$ (x=3 to 18), acid form of Zonyl ® FSA in Dowanol DM. The resulting solution is cast on a microscope slide and cured at 160° C. for 45 minutes to yield a 4-H pencil hardness that does not wet with hexane, acetone, methanol or water.

EXAMPLE 2

Preparation of Coatings Based on Poly AEM

A coating formulation is prepared by mixing 1.0 g (1.04 mil eq.) of 13.3 percent Poly AEM (in water) with 0.05 g aqueous ammonia (29.2 percent ammonia) 3 g diethylene glycol methyl ether, 1.0 g of 0.8N (Zonyl ® Acid) (0.8 mil eq.) and 0.1 g of 2N malonic acid in water (0.2 mil eq.). The resulting coating is cured on a microscope slide at 160° C. for 45 minutes to yield a coating with a pencil hardness of greater than 6-H. This coating does not wet with hexane, methanol, acetone or water.

EXAMPLE 3

Polyvinylbenzylamine (Poly VBA)

A solution of 40 g VBA in 350 ml water is adjusted to pH 7 with hydrochlorine acid and warmed under nitrogen to 65° C. With stirring 0.2 g of 2,2'(2-methylpropionitrile) is added. After 5 hours the resulting polymer solution is exposed to high speed mixing and concentrated aqueous ammonia is added. The solid polymer is washed 5 times with water and dissolved in ethylene glycol dimethyl ether.

Preparation of a Coating Based Upon Poly VBA

A coating solution is prepared by mixing 2.0 g of a 5.05 percent Poly VBA (0.75 mil eq.) in diethylene glycol methyl ether with 0.075 g aqueous ammonia (29.2 percent ammonia) and 0.875 g of 0.8N Zonyl ® FSA Acid (0.70 mil eq.) in diethylene glycol methyl ether. The solution is cast on a microscope slide and cured at 160° C. for 30 minutes. The resulting coating has a pencil hardness of greater than 6-H and a critical surface tension of wetting of between 12 and 13 dynes/cm.

What is claimed is:

1. A polymer composition comprising pendant amine-functional portions linked to a perfluorocarbon moiety having a perfluoroalkyl group through a carboxy group and having repeating units of the formula:

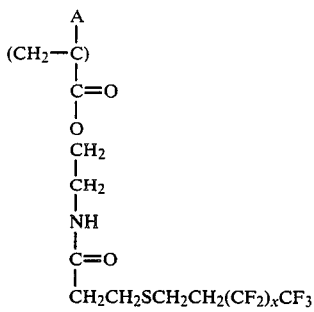

wherein A is hydrogen or methyl, and x is from about 3 to about 18.

2. A composition of claim 1 represented by the formula:

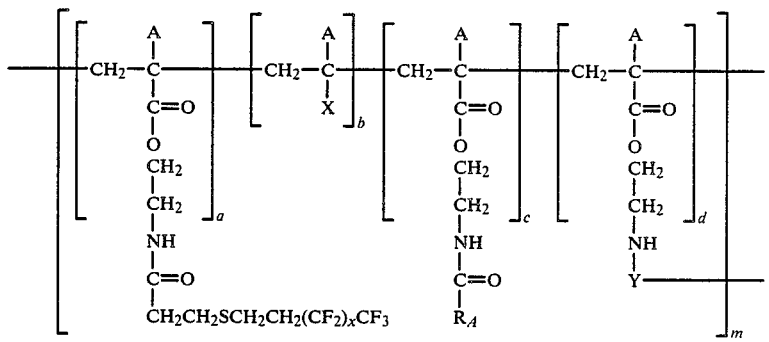

wherein $a+b+c+d=1$, a is greater than 0, b is from about 0 to about 0.9, c is from about 0 to about 0.9, d is from 0 to about 0.8, m is from about 100 to about 10,000, X is an essentially nonionic or ionic moiety and Y is the remaining portion of a polycarboxylic acid and is present in such a way that crosslinking is introduced to the polymer system, and $R_A$ is an alkyl or aryl moiety.

3. A composition of claim 2 wherein $b=0$, $c=0$ and $d=0$.

4. A composition of claim 2 wherein $b=0$ and $d=0$.

5. An adherent composition comprising the polymer of claim 2.

* * * * *

UNITED STATES PATENT AND TRADEMARK OFFICE
CERTIFICATE OF CORRECTION

PATENT NO. : 4,764,564

DATED : August 16, 1988

INVENTOR(S) : Donald L. Schmidt and Demetrius Urchick

It is certified that error appears in the above-identified patent and that said Letters Patent is hereby corrected as shown below:

Column 1, line 11, delete "relese" and insert --release--

Column 3, line 33 - 34, delete "aci-did" and insert --acidic--

Column 6, Example 3, line 66, delete "0.8N" and insert --0.80N--

Signed and Sealed this

Nineteenth Day of June, 1990

Attest:

HARRY F. MANBECK, JR.

*Attesting Officer*  *Commissioner of Patents and Trademarks*